United States Patent [19]

Bevins, Jr.

[11] Patent Number: 5,093,921

[45] Date of Patent: Mar. 3, 1992

[54] INITIALIZATION TECHNIQUE AND APPARATUS FOR SET TOP CONVERTERS

[75] Inventor: George L. Bevins, Jr., Suffolk, Va.

[73] Assignee: Comband Technologies, Inc., Chesapeake, Va.

[21] Appl. No.: 452,358

[22] Filed: Dec. 19, 1989

[51] Int. Cl.⁵ ............................................. H04B 1/00
[52] U.S. Cl. ......................................... 455/4; 358/86; 380/20
[58] Field of Search .................. 455/3, 4, 6, 2; 358/86; 380/10, 20

[56] References Cited

U.S. PATENT DOCUMENTS

| | | | |
|---|---|---|---|
| 4,418,424 | 11/1983 | Kawamoto et al. | 455/4 |
| 4,475,123 | 10/1984 | Dumbauld et al. | 380/20 |
| 4,510,623 | 4/1985 | Bonneau et al. | 455/151 |
| 4,673,976 | 6/1987 | Wreford-Howard | 380/10 |
| 4,760,597 | 7/1988 | Hayes et al. | 455/4 |
| 4,792,972 | 12/1988 | Cook, Jr. | 455/4 |

Primary Examiner—Reinhard J. Eisenzopf
Assistant Examiner—Edward Urban
Attorney, Agent, or Firm—Whitham & Marhoefer

[57] ABSTRACT

A CATV/MDS set top converter installation process is performed at the installation site without access to any internal components of the converter. The process is performed in two stages. In the first stage, the converter is pre-programmed with a first set of proprietary data by the installer using a hand held IR transmitter. In the second stage, the converter is addressed over-the-air by the addressing computer at the head end of the system to program the converter with a second set of proprietary data.

13 Claims, 10 Drawing Sheets

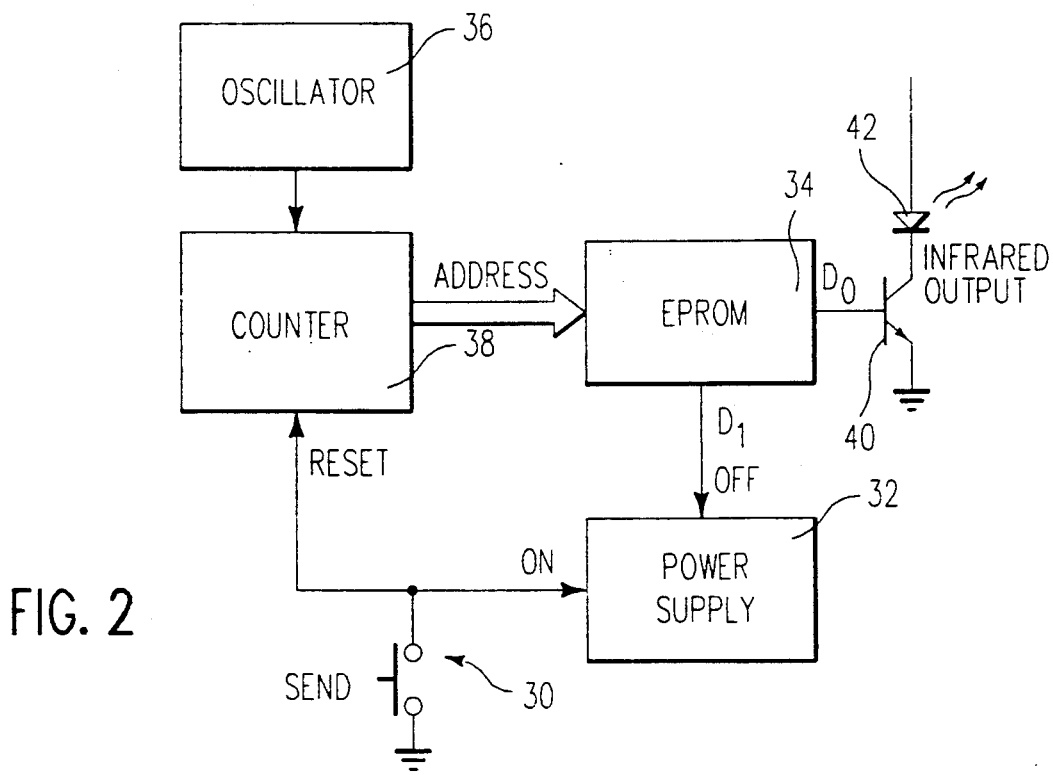
FIG. 2
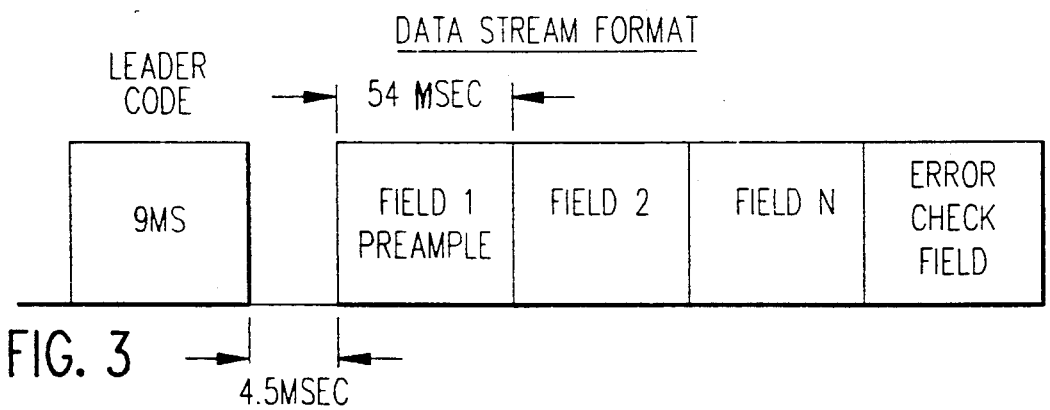
FIG. 3
FIELD FORMAT
TIMING FOR ALL FIELDS IS IDENTICAL, EXCEPT DATA FIELD 1 CONTAINS 33 BITS, 1 SYNC AND 32 DATA BITS. ALL OTHER FIELDS CONTAIN 32 DATA BITS AND NO SYNC BIT.
| BYTE 1 | BYTE 2 | BYTE 3 | BYTE 4 |
|---|---|---|---|
| 8 BITS | 8 BITS | 8 BITS | 8 BITS |
| DATA 1 | DATA 1 | DATA 2 | DATA 2 |
FIG. 4

INITIALIZATION TECHNIQUE AND APPARATUS FOR SET TOP CONVERTERS

BACKGROUND OF THE INVENTION

1. Field of the Invention

The present invention generally relates to television distribution systems such as cable television (CATV) and multipoint distribution service (MDS) and, more particularly, to an installation and initialization technique which allows a nontechnically trained installer to quickly and accurately load any number of variable items into nonvolatile memory in a set top converter.

2. Description of the Prior Art

Modern CATV and MDS systems employ subscriber converters which can accept and process digital data emanating from an addressing computer in the head end of the distribution system. The digital data conveys commands which can enable and disable a converter, control the availability for viewing of channels and implement other ancillary functions. Addressable converters store digital data in an internal memory which defines the converter address and level of service to be provided to the subscriber.

Existing converters have a number of disadvantages. Establishing an address for the converter is a time consuming and expensive procedure to the manufacturer of the converter and the cable operator. Two basic approaches have been used. One approach is for the manufacturer of the converter to program data into nonvolatile memory to store converter addresses. Another approach is for the manufacturer to ship converters to television distribution system operators without addresses assigned. The system operators, in turn, must then unpack the converters, remove converter covers, remove memory integrated circuits (ICs) from the converters and insert them in a programming fixture to insert the address codes, and then to reassemble the converters prior to installation in individual homes. This procedure is labor intensive and raises the possibility of damage to the ICs and the converter itself. Furthermore, the system operator is required to maintain very accurate records of the assigned addresses so that the correlation between a given address and a subscriber installation can be verified and that duplicate address assignments do not occur.

One solution to this problem is described in U.S. Pat. No. 4,760,597 to Hayes et al., now assigned to the assignee of this application. According to that invention, a technician set-up unit is used with an addressable television signal converter having a radio frequency (RF) input port and a data port and that is responsive to a television signal distribution system to be remotely controlled by an addressing computer. The technician set-up unit includes an RF input port for receiving RF coded command signals from the addressing computer. An RF output port is provided which is connectable to the RF input port of the converter. A data port is connectable to the data port of the converter for receiving digital data signals from and sending digital data signals to the converter. The technician set-up unit includes control means responsive to the RF coded command signals for coordinating the exchange of RF and digital data signals between the converter and the technician set-up unit through the respective connected RF and data ports.

In operation, the Hayes et al. technician set-up unit forms a hardware link between the converter and the addressing computer. Data is downloaded to the converter by the addressing computer to define the converter address and to establish the appropriate level of service. The technician set-up unit interrupts RF signals to the RF input port of the converter and inputs data from the addressing computer to the data port of the converter. The converter address data is loaded into the converter memory upon reinstatement of the RF addressing commands to the converter. The data which has been stored in the converter is subsequently read to verify proper installation. When the installation is verified, a final command is sent to the converter to render it operational. If verification fails, the converter is rendered inoperative.

While the Hayes et al. technician set-up unit and the procedures employed represent a significant improvement over the prior art, it nevertheless suffers some disadvantages. Specifically, the unit must be interconnected with the converter and installation must be correlated with the addressing computer at the head end of the distribution system. The interconnection of the unit with the converter and the subsequent operation of the unit require a certain level of skill and training of the installer. Moreover, it may not always be convenient or possible to arbitrarily correlate the installation process with the addressing computer.

SUMMARY OF THE INVENTION

It is therefore an object of the present invention to provide an installation and initialization technique for television converters that allows a non-technically trained installer to quickly and accurately load any number of variable items into the non-volatile memory of the converter.

It is another object of the invention to provide a procedure for the installation of television converters that allows the system operator to efficiently control the final initialization of the converters.

It is a further object of the invention to provide a television converter which has limited operability and becomes inoperative after a period of time unless properly initialized from the head end of the distribution system and therefore thwarts theft of equipment.

It is a further object of the invention to provide the ability to customize a converter during initialization allowing a system operator to use block down converters from a variety of vendors.

According to the present invention, the installation of the converters is accomplished, in part, by means of a small, hand held infrared transmitter which the installing technician uses to transmit an encoded pattern of pulses to the converter. The encoded information includes such information as viewing channel number and frequency, market code field and other information specific to the converter's hardware. Once initialized by the field installer, the system operator then assumes control by over-the-air commands from the addressing computer. In the context of this invention, "over-the-air" includes both CATV (i.e., cabled) and MDS (i.e., wireless) systems.

Initially, the converter, as received from the factory, is totally inoperative. After the technician places it in the programmed state, the converter is partially operative; that is, it can receive only those channels the system operator has designated for initial viewing. Some features, as for example parental control and premium channels, are inoperative and must be authorized by the addressing computer after installation is complete. Moreover, the converter is partially operative for only a limited period of time in a basic service level, and it becomes inoperative if the final stage of the initialization process is not accomplished by over-the-air commands transmitted from the head end within a predetermined period of time. Since the converter will become inoperative after this predetermined period of time and the hand held infrared transmitter can only make the converter partially operative, theft is discouraged even by those who may come into possession of a hand held infrared transmitter.

The initialization procedure according to the invention using as it does the hand held infrared transmitter allows a degree of flexibility not otherwise afforded by prior systems. For example, a system operator may purchase block down converters from two vendors. If the converters from the two vendors should use different local oscillator frequencies, the system operator can acquire different hand held infrared transmitters, one used to install a converter manufactured by one vendor and one to install a converter manufactured by another vendor.

Thus, the invention eliminates the need for the field installer to interconnect the converter with a set-up unit and operate that unit. Instead, the installer operates an infrared transmitter of the type generally used for remote control of television and other home entertainment equipment. In addition, the installation process in a subscriber's home does not need to be correlated with the addressing computer at the head end of the distribution system. The final stage of the initialization process can be carried out at a time convenient to the operation schedule at the head end.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a block diagram of the infrared transmitter used in the initialization process;

FIG. 3 is a diagram showing the data stream format used in the initialization process;

FIG. 4 is a diagram showing the field format;

DETAILED DESCRIPTION OF A PREFERRED EMBODIMENT OF THE INVENTION

Figure 1:
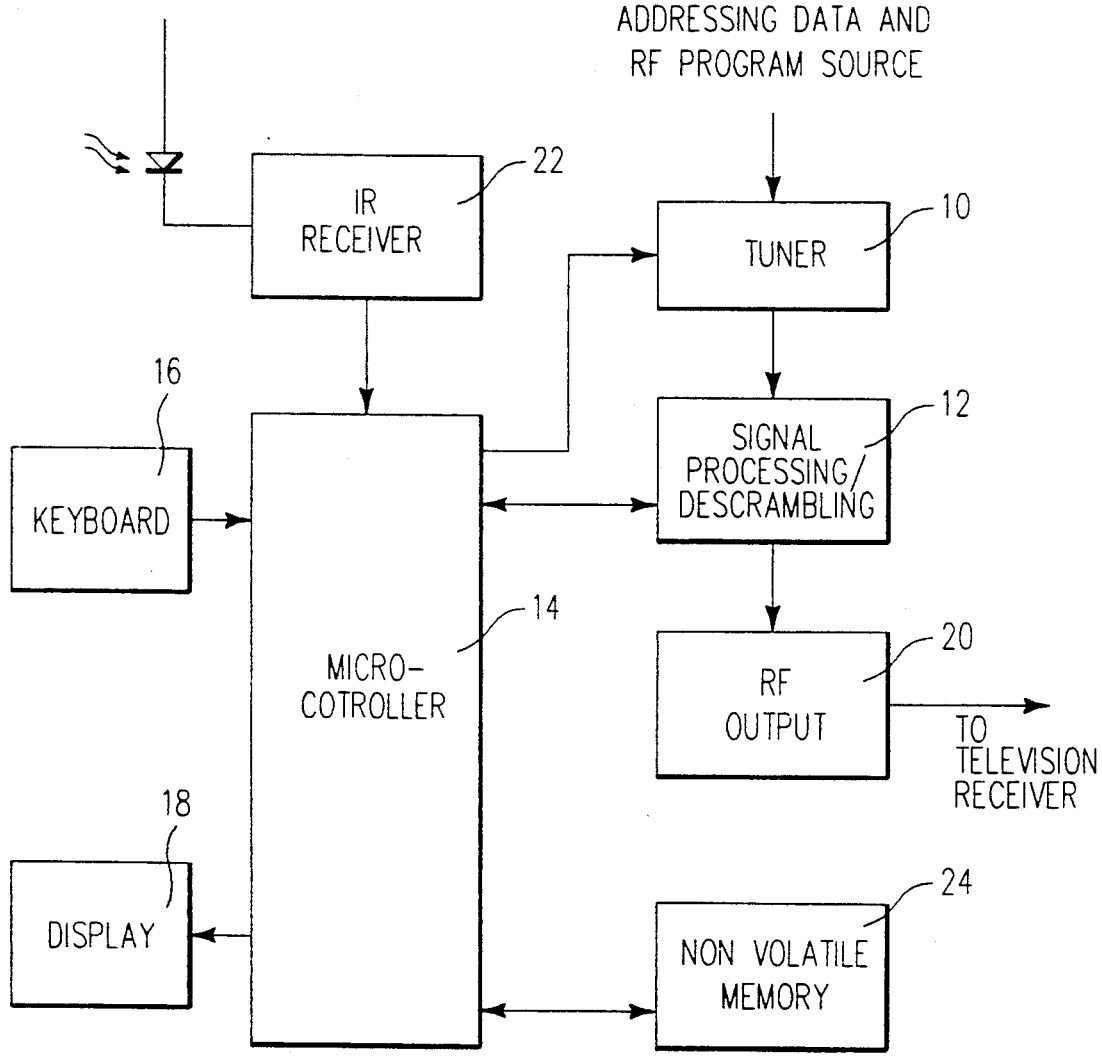
FIG. 1 is a block diagram of the set top converter used in the practice of the invention.

Referring now to the drawings, and more particularly to FIG. 1, there is shown a block diagram of the set top converter. Scrambled television signals and addressing data are applied to the tuner 10. Addressing data is recovered in the signal processing and descrambling circuit 12 and sent to the micro-controller 14. A standard keyboard 16 and display 18 are used to control converter functions such as ON/OFF and channel selection. The processed and descrambled television program is converted to a standard NTSC television format signal on a low very high frequency (VHF) channel (i.e., channel 2 or channel 3) by the RF output stage 20 and sent to the subscriber's standard television set for viewing. The infrared (IR) receiver 22 removes the serially coded remote control information from the IR carrier, and the micro-controller 14 decodes this information in a standard fashion using a software algorithm permanently stored inside the microcontroller.

In addition to decoding standard IR remote control commands, such as channel selection, the micro-controller 14 will detect and process custom environment loader (CEL) transmissions received by the IR receiver 22 using special software, in a manner similar to that for over-the-air transmissions. Proprietary data in these transmissions are read into a non-volatile memory 24, such as an electronically alterable read only memory (EPROM), in the first stage of the initialization process. In the second stage of the initialization process, the converter is addressed over-the-air by the addressing computer at the head end, and further proprietary data is loaded into the non-volatile memory 24.

A typical CEL hand held IR transmitter is shown in FIG. 2. When the send button 30 is pressed, power supply 32 applies power to the circuit and is latched on until an end-of-transmission is indicated by EPROM 34 output $D_1$ transitioning from a low level to a high level. With power applied, the oscillator 36 begins oscillating. When the send push button 30 is released, the counter 38, which has been held in reset, begins to increment from zero. The binary output of the counter 38 is applied to the address inputs of the EPROM 34, causing it to sequentially access the data stored therein. That data on the $D_0$ line is applied to an output transistor 40 which causes current to flow through an IR emitting diode 42. The resulting pulsed IR signal is radiated towards the set top converter.

There are, of course, many other ways of producing this stream of IR pulses known to practitioners of the art. Among them would be a micro-processor with software defining the pattern, programmable logic arrays (PLAs), and other forms of state machines, including discrete logic. Therefore, it will be understood that this description is not intended to define all possible hardware implementations. Rather, the intent here is to define the process whereby initialization information is transferred to a set top converter in an automatic fashion.

In the preferred embodiment, the CEL conveys the following data items:

1. Homing channel viewing channel number.
2. Homing channel table pointer.
3. Tuning reference data for channels MDS1 and A1 (this data effectively providing the downconverter local oscillator frequency).
4. CEL ID number.
5. Market code.
6. Enable/disable block downconverter power supply.
7. Channel allocation plan.
8. Enable/disable channel mapping.
9. A/B switch control.
10. Channel output frequency.
11. Error detection.

Figure 5:
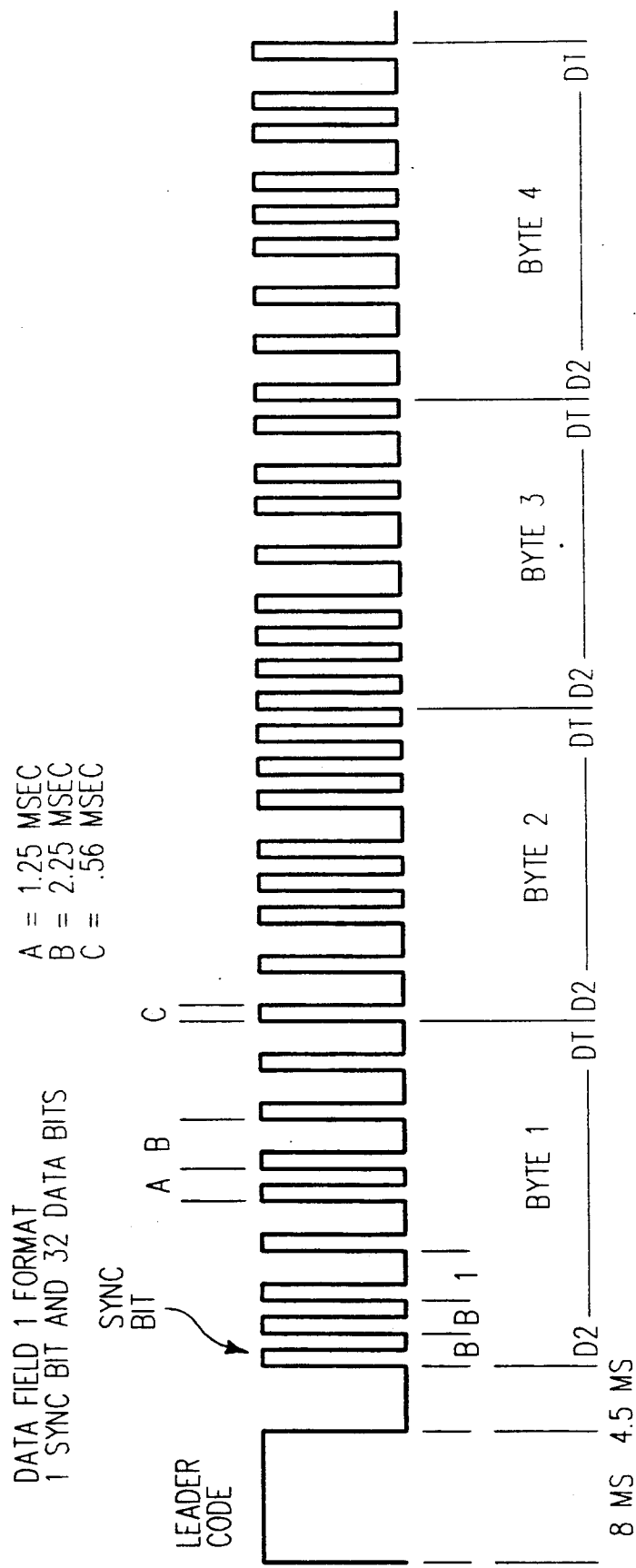
FIG. 5 is a timing diagram for field one.

The CEL will generate seven data fields with no timing gap separating each data field as generally illustrated in FIG. 3. The first data field is preceded by a 9 msec. leader code, and a 4.5 msec. gap. Data field one, shown in more detail in FIG. 4, consists of one sync bit and 32 data bits. All other fields contain 32 data bits. The individual bit timing for field one is illustrated in the timing diagram of FIG. 5. In FIG. 5, it will be observed that the pulse widths, designated by the dimension C, is 0.56 msec. Binary data, represented by zeros and ones, is encoded as distances between pulses. Thus, the distance A, 1.25 msec., represents a binary zero and the distance B, 2.25 msec., represents a binary one.

The data fields include the following information: Field 1 is the Preamble. Field 2 includes CEL ID and Configuration Data, the latter data being the Channel Allocation Plan, AB Switch Control, Channel Output Frequency, and Channel Mapping. Field 3 includes Homing Channel Data. Field 4 includes Tuning Reference Data for MDS1. The tuning reference data for MDS1 equals the downconverted picture carrier frequency for the MDS1 channel (in megaHertz) divided by 62.5 kHz. This data value can exceed eight bits and therefore requires two bytes to be fully specified. Field 5 includes the Tuning Reference Data for A1. The tuning reference data for A1 equals the downconverted picture carrier frequency for the A1 channel (in megaHertz) divided by 62.5 kHz. This data value can exceed eight bits and therefore requires two bytes to be fully specified. Field 6 includes the Market Code (0-65535). Field 7 is an Error Check Field.

Several error detection tests are performed. If any error is detected, the command is ignored. The following error detection tests are performed:

1. Seven data fields with four bytes per field must be received.

2. The data in field one must equal the values listed.

3. The ID must be between 1 and 99 (decimal), inclusive.

4. Values for the homing channel, viewing channel number and market code must be within the ranges specified.

5. The exclusive OR of data bytes 1 and 2 and of data bytes 3 and 4 of each field in fields two to seven, inclusive, must equal zero.

6. The eight bit two's complement sum of bytes one and three of fields two through six must be equal to byte three of field seven.

Turning now to FIGS. 6A to 6E, the logic of the processing of the CEL transmissions will now be explained. The process begins in FIG. 6A by checking for the reception of a remote transmission. The remote transmission may be from a remote control IR transmitter or a CEL IR transmitter. Therefore, it is necessary to first detect a remote transmission and then to recognize that the remote transmission is from a CEL IR transmitter. This is done by first testing in decision block 50 to determine if the remote input has gone low. If not, the system continues to monitor for remote transmissions. However, if a remote transmission is detected, the time from the last low transition is calculated in function block 51, and this time is tested in decision block 52 to determine if it is greater than 65 msec. If it is, the mode is set to zero in function block 53, and the system continues processing by looping back to decision block 50. Otherwise, a test is made in decision block 54 to determine if the mode is zero. If the mode is zero, the mode is set to one in function block 55, control loops back to decision block 50 and the system continues processing. Otherwise, a test is made in decision block 56 to determine if the mode is one. If so, a further test is made in decision block 57 to determine if the time is approximately equal to 2.81 msec. If so, a flag is set in function block 58 indicating that a button on the standard IR transmitter is being held down and, if appropriate, the function should be repeated (i.e., channel up). The system then continues processing by looping back to decision block 50. Otherwise, a test is made in decision block 59 to determine if the time is approximately 5.06 msec. If so, the mode is set to two and the bit count set to zero in function block 60 setting up the detection of transmissions from a CEL IR transmitter. The system then continues processing by looping back to decision block 50.

Figure 6A:
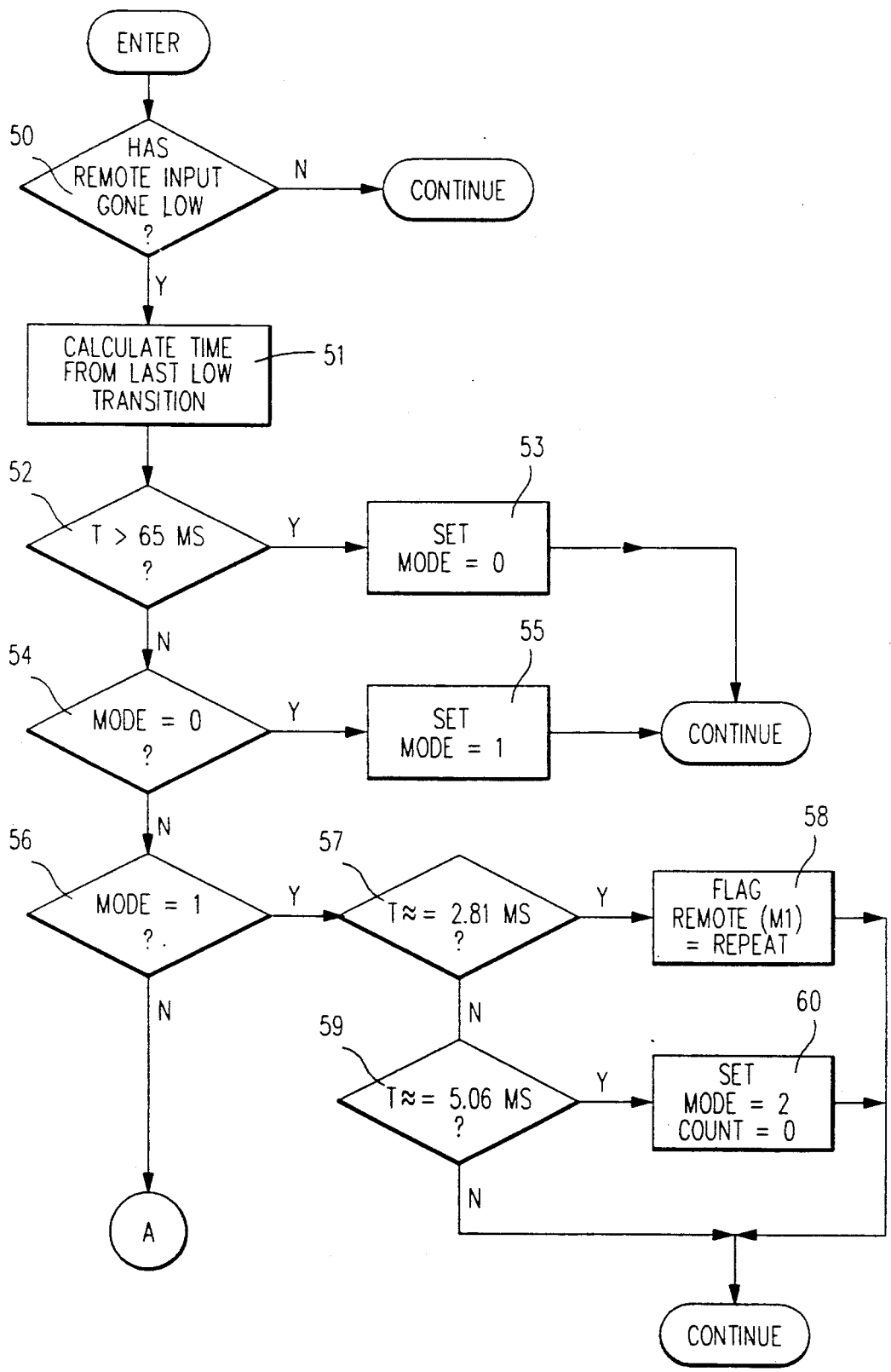
FIGS. 6A to 6E, taken together, are a flow diagram of the logic of the processing of transmissions from the infrared transmitter.
Figure 6B:
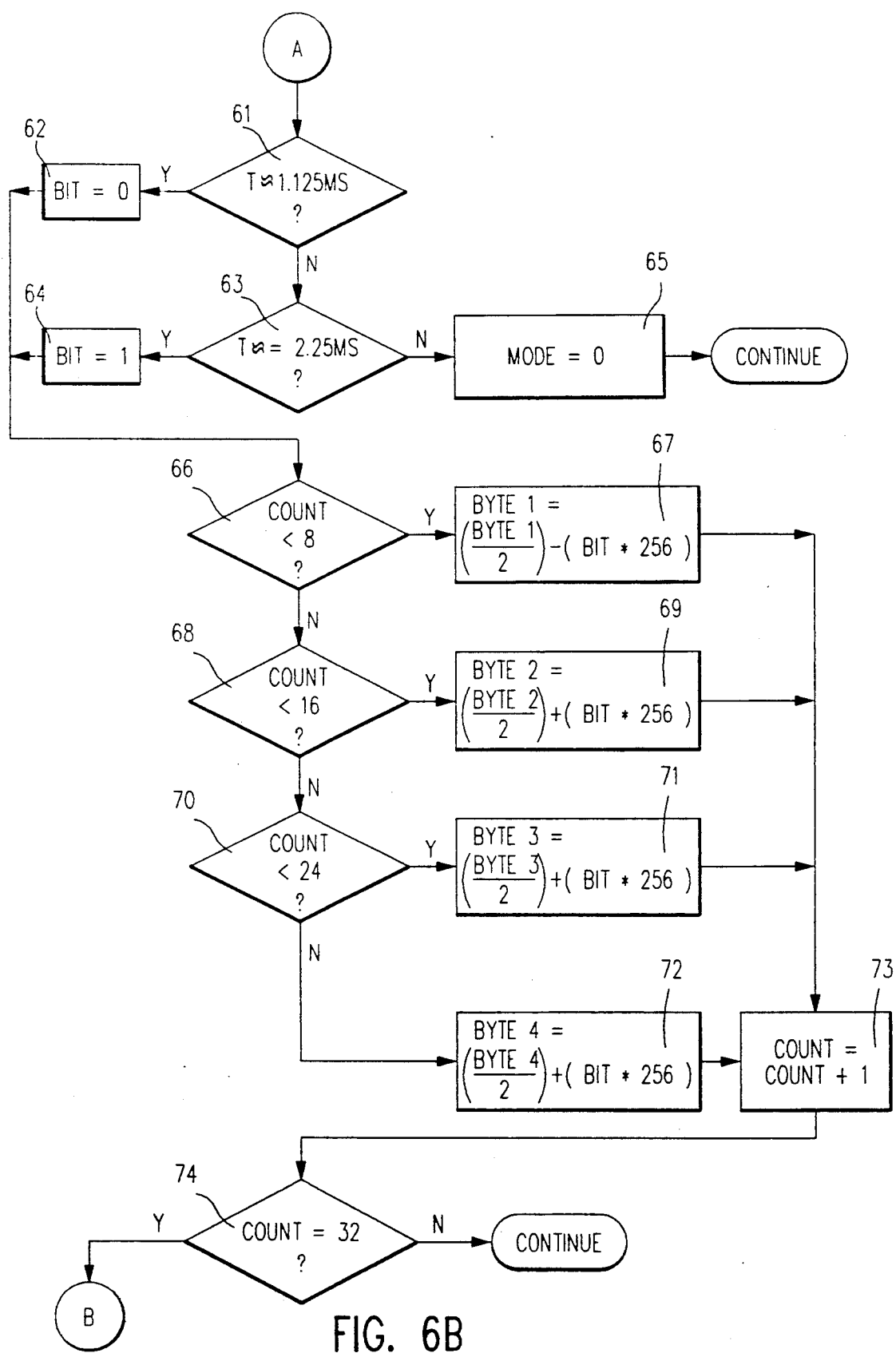

The processing performed by the logic shown in FIG. 6A is primarily for the purpose of recognizing the beginning of a valid transmission (as opposed to noise) and to determine if this is the beginning of four bytes of data or if this is a repeat pulse. Returning to decision block 56, if the mode is not one, a transmission from an IR transmitter has been detected, and the process continues on FIG. 6B where a test is made in decision block 61 to determine if the time is approximately 1.125 msec. If it is, the bit is determined to be a binary zero in function block 62. See the timing diagram in FIG. 5. If not a binary zero, a test is made in decision block 63 to determine if the time is approximately 2.25 msec. If it is, the bit is determined to be a binary one in function block 64. Again, see the timing diagram in FIG. 5. If not a binary one, the mode is determined to be zero in function block 65, and the system continues processing by looping back to decision block 50 in FIG. 6A. Once the bit is determined to be either a binary zero or a binary one, a test is made in decision block 66 to determine if the bit count is less than eight. If so, the bit is determined to be part of byte one in function block 67. If the bit count is greater than eight, a further test is made in decision block 68 to determine if the bit count is less than sixteen. If so, the bit is determined to be part of byte two in function block 69. If the bit count is greater than sixteen, an additional test is made in decision block 70 to determine if the bit count is less than twenty-four. If so, the bit is determined to be part of byte three in function block 71. If the bit count is greater than twenty-four, the bit is declared to be part of byte four in function block 72. Once the bit is associated with a byte in the field, the bit count is incremented by one in function block 73 and a test is made in decision block 74 to determine if the bit count equals thirty-two, which is the length of a field. If so, processing continues in FIG. 6C; otherwise, control loops back to decision block 50 in FIG. 6A to continue processing other transmissions.

Figure 6C:
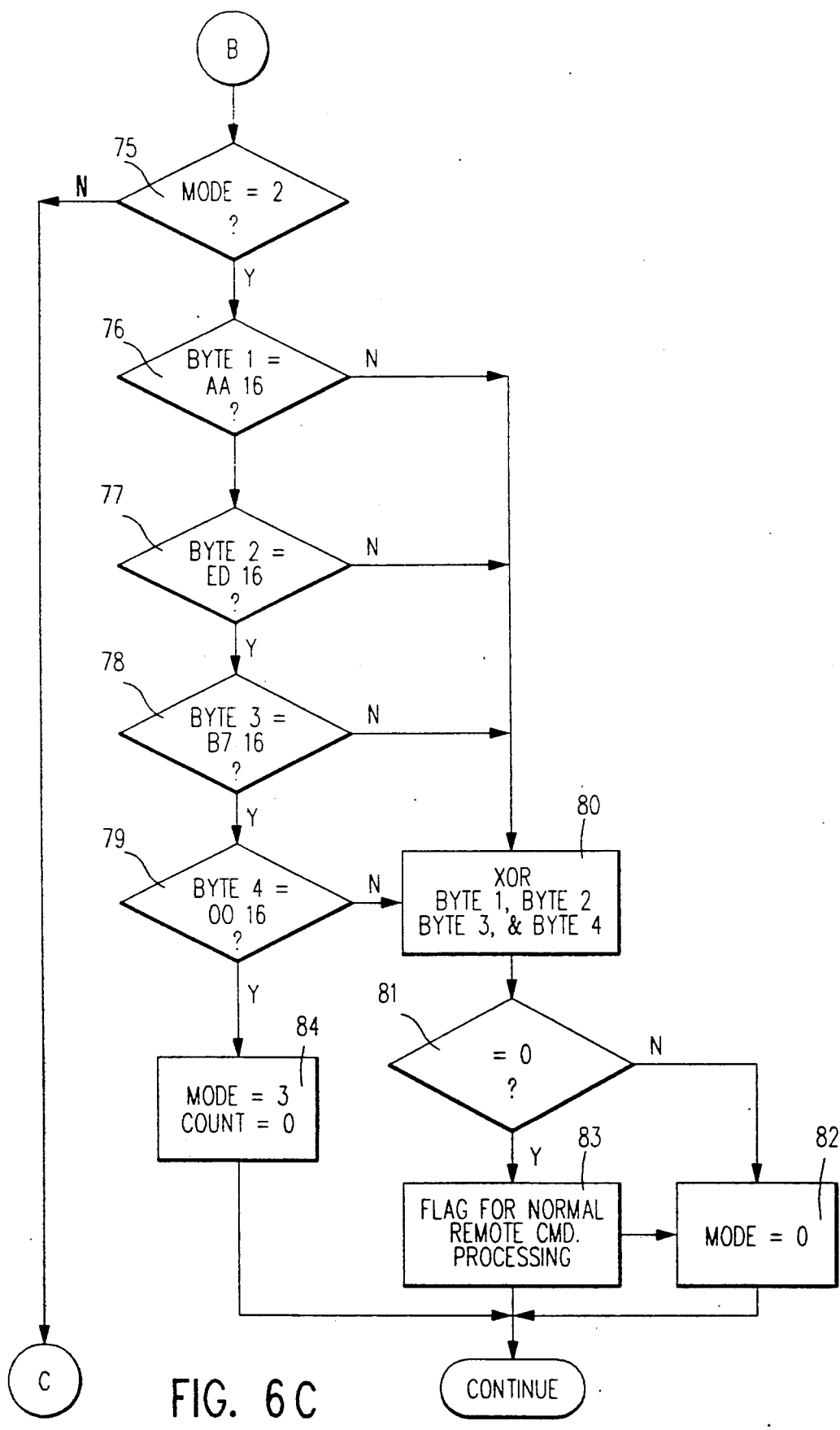

In FIG. 6C, a first test is made in decision block 75 to determine if the mode is mode two. If the mode is mode two, a further test is made in decision block 76 to determine if byte one is equal to AA (hexadecimal), and if so, byte two is tested in decision block 77 to determine if it is ED (hexadecimal), and if so, byte three is tested in decision block 78 to determine if it is B7 COM.001 (hexadecimal), and finally if so, byte four is tested in decision block 79 to determine if it is 00 (hexadecimal). If so, then the CEL preamble has been detected, and processing will continue with additional data fields. If any of these tests are negative, then bytes one and two and bytes three and four are respectively exclusive ORed in function block 80 and the result tested in decision block 81 to determine if it is a zero. If not, the mode is set to zero in function block 82; otherwise, a flag is set in function block 83 for normal remote transmission processing. In either case, control loops back to decision block 50 in FIG. 6A to continue processing. If, however, the test in decision block 79 is positive, the mode is set to three and the bit count is set to zero in function block 84. This sets up the system to detect data transmitted in fields two through seven. Control then loops back to decision block 50 to continue processing.

Figure 6D:
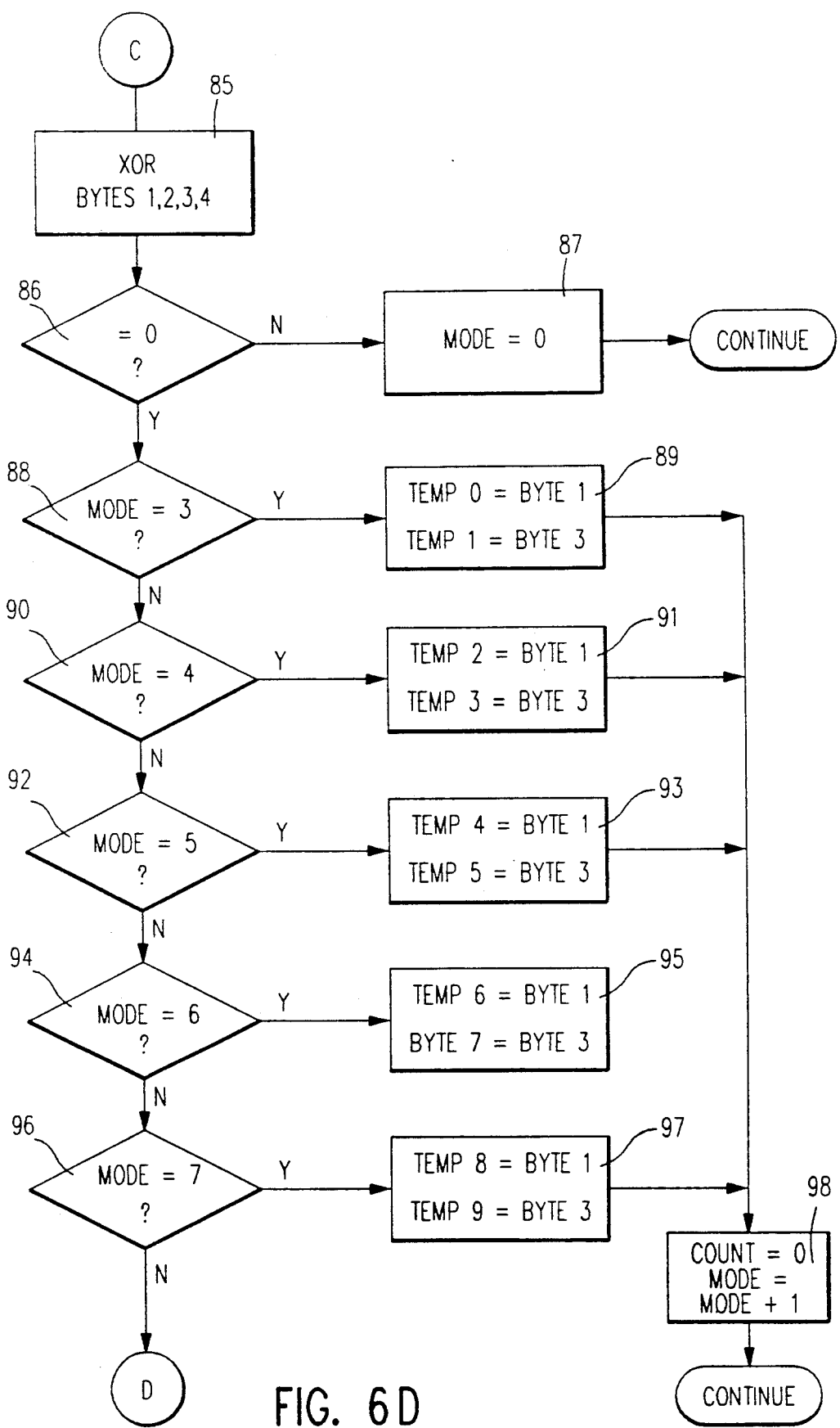

A negative result in the test in decision block 75 (i.e., the mode is three or greater) transfers control to FIG. 6D, to which reference is now made. Bytes one and two and bytes three and four are exclusive ORed in function block 85 and tested in decision block 86 to determine if they are equal to zero. If not, the mode is set to zero in function block 87, and control loops back to decision block 50 in FIG. 6A to continue processing. Otherwise, a test is made in decision block 88 to determine if the mode is three. Mode three corresponds to field two. If so, bytes one and three are temporarily stored in registers 0 and 1, respectively, in function block 89; otherwise, a test is made in decision block 90 to determine if the mode is four. Mode four corresponds to field three. If so, bytes one and three are temporarily stored in registers 2 and 3, respectively, in function block 91; otherwise, a test is made in decision block 92 to determine if the mode is five. Mode five corresponds to field four. If so, bytes one and three are temporarily stored in registers 4 and 5, respectively, in function block 93; otherwise, a test is made in decision block 94 to determine if the mode is six. Mode six corresponds to field five. If so, bytes one and three are temporarily stored in registers 6 and 7, respectively, in function block 95; otherwise, a test is made in decision block 96 to determine if the mode is seven. Mode seven corresponds to field six. If so, bytes one and three are temporarily stored in registers 8 and 9, respectively, in function block 97. If the mode is not one of modes three to seven, then the field is field seven and, control goes to FIG. 6E. If bytes one and three are temporarily stored, then the bit count is set to zero, and the mode is incremented by one in function block 98 before control loops back to decision block 50 to continue processing.

Figure 6E:
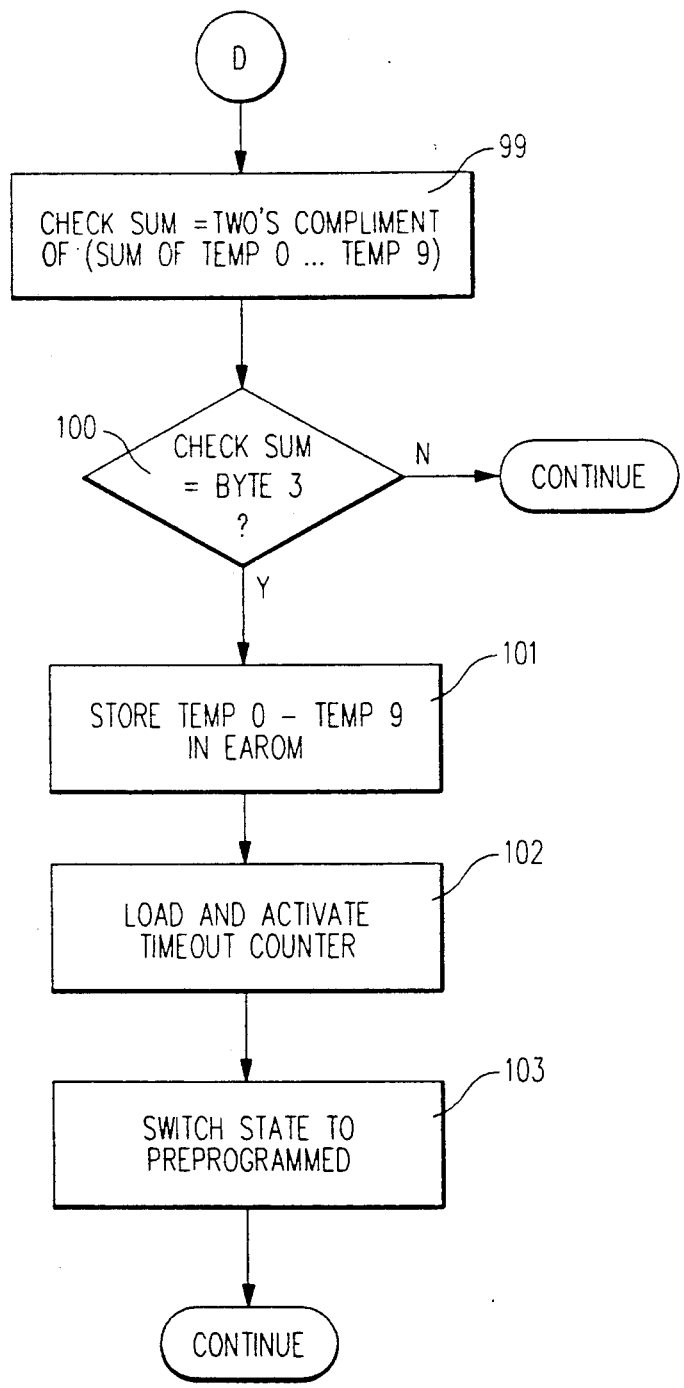

In FIG. 6E, the checksum which is the two's complement of the contents of temporary registers 0 to 9 is generated in function block 99. This checksum is then compared with byte 3 of field seven and if they are equal, the contents of temporary registers 0 to 9 are stored in EPROM in function block 101; otherwise, control loops back to decision block 50 to continue processing. Then, in function block 102, the timeout counter is loaded and activated, and in function block 103, the state is switched to preprogrammed, and control loops back to decision block 50 to continue processing.

At this point, the converter is in its initial programmed state; that is, it is partially operative allowing the user to view selected channels, and the converter will respond to remote transmissions from an IR remote control transmitter for channel selection. Particular features, such as premium channel viewing and parental lockout, are not enabled. The converter is now ready to receive over-the-air transmissions from the head end to complete the installation process. If the over-the-air transmissions are not received before the timeout counter set in function block 102 times out, the converter will become inoperative so that even basic viewing is not permitted. However, the converter will be in a preprogrammed timeout state and will respond to over-the-air transmissions even though the timeout counter has timed out. As a result, it is not necessary for the technician to return to the subscriber's home to re-initialize the converter. Once the converter goes to a preprogrammed timeout state, it cannot be set again to the preprogrammed state using a CEL IR transmitter.

Figure 7:
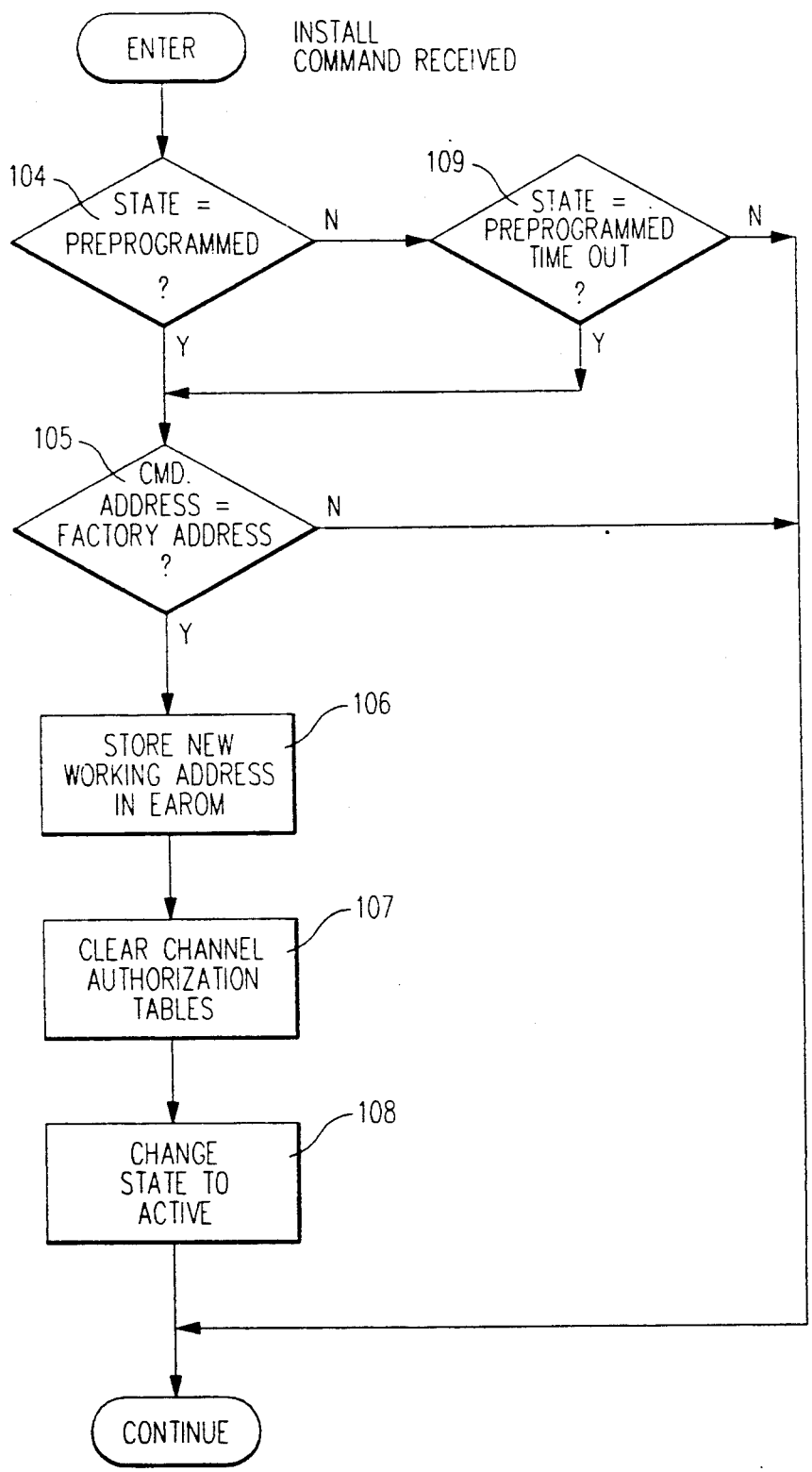
FIG. 7 is a flow diagram of the logic for processing the over-the-air installation sequence.

The logic for processing the over-the-air installation sequence is shown in FIG. 7 and begins by testing in decision block 104 to determine if the state is the preprogrammed state. If so, a test is made in decision block 105 to determine if the command address is the factory address. If so, the new working address is stored in EPROM in function block 106, and the channel authorization tables are cleared in function block 107. At this point, the installation process is complete and the state is changed to active in function block 108.

Returning to decision block 104, if the state is not preprogrammed, then a further test is made in decision block 109 to determine if the state is preprogrammed timeout. If so, control goes to decision block 105; otherwise, the final installation process is aborted and processing not part of this function continues. Likewise, if the command address tested in function block 105 is not the factory address, the final installation process is aborted and processing not part of this function continues.

Figure 8:
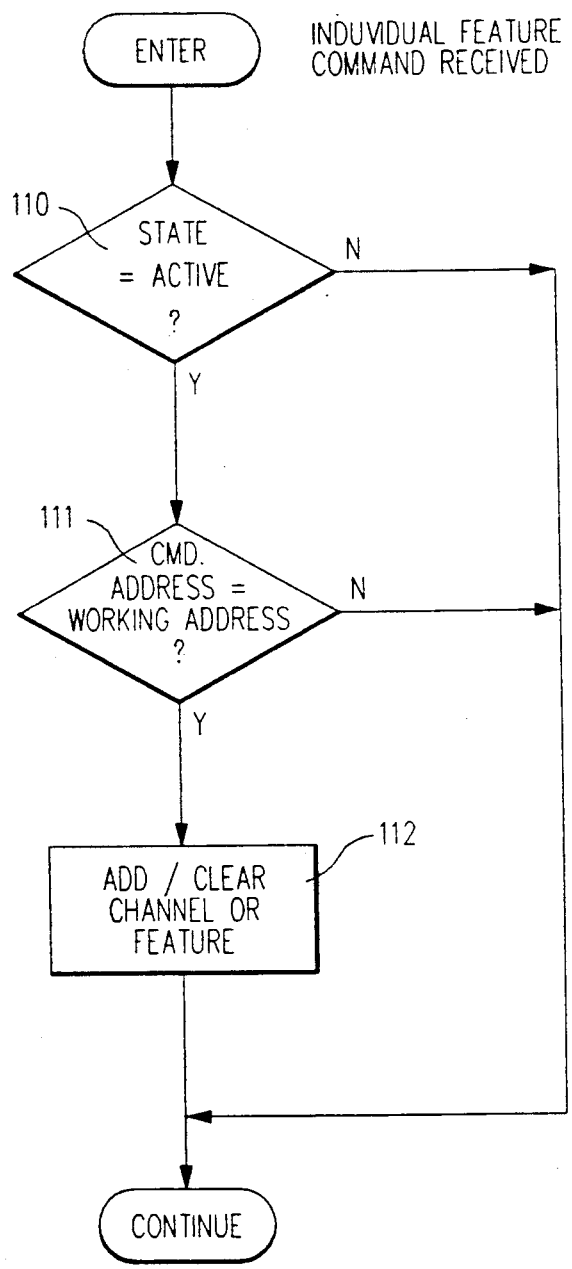
FIG. 8 is a flow diagram of the logic for processing the over-the-air commands which enable or disable channel authorizations or other features of the converter.

FIG. 8 shows the logic of the processing of over-the-air commands which enable or disable channel authorizations or other features. The process begins by testing in decision block 110 to determine if the state of the converter is active. If it is, then a further test is made in decision block 111 to determine if the command address is the working address stored in function block 106. If it is, then the add or clear channel or other feature is implemented in function block 112 before control returns to other processing not part of this function. If the tests in either of decision blocks 110 or 111 is negative, then the command process is aborted and the system returns to processing not part of this function.

Thus, in the process according to the invention, any set top converter in the distribution system operator's inventory can be taken from stock, transported to the subscriber's premises, and quickly and easily initialized at the installation site. The custom hand held CEL IR transmitter is used by the installing technician to load installation information directly into the EPROM of the set top converter. The information sent is contained in an EAROM in the transmitter which is pre-programmed with whatever information is necessary to initialize the set top converter. Typically, this would include the viewing channel number of the data carrying or homing channel, information to calculate the homing channel tuning frequency, a market code field to prevent reception if the converter is moved to another area, and other information specific to the converter's hardware (e.g., RF output on channel 2, 3 or 4).

The head end addressing computer continuously transmits, as a background task, a channel map table. This table will contain an entry identifying any channel which is in the basic service tier (at a minimum, the homing channel). After receipt of this map, the subscriber may tune and watch any authorized basic service channels. Physical installation is now complete, and the installer will record the serial number of the set top converter on his work order and return the work order to the head end facility.

While the converter is in this pre-programmed state, it will continue to receive and unscramble subscriber programming for only a fixed period of time (e.g., 72 hours) unless it receives a specific over-the-air final installation sequence from the head-end addressing computer sent specifically to the converter's factory control number. Furthermore, it will no longer process transmissions from the CEL, so that the time out period may not be reset.

When the work order is received at the business office, the final installation sequence is sent over-the-air. Next, any other services or channels ordered by the subscriber are authorized over-the-air in the normal method. Finally, the association is made between the subscriber and a specific set top converter in the addressing computer's database. This completes the logical installation of the converter. At this time, the converter is no longer in the pre-programmed state and is now active.

It should be noted that an active converter may be removed from one location and reinstalled at another location using the same procedure. On reinstallation, the CEL would remove any information from the converter memory associated with the first subscriber prior to the initialization procedure.

By using more than one CEL, it is possible to "customize" installations using different hardware configurations within a single system. This is quite an advantage. For example, where block down converters supplied by different vendors having different local oscillator frequencies are mixed in a system, the hardware is handled by the installation personnel, while the addressing computer sees only a single, uniform system for addressing and billing purposes. In other words, details of the installation are not a burden on the head end but are confined to a lower level of the installation process. In software terminology, this is known as modularity. The object is to give a process access to only the information necessary for its function.

While the invention has been described in terms of a single preferred embodiment, those skilled in the art will recognize that the invention can be practiced with modification within the spirit and scope of the appended claims.

Having thus described my invention, what I claim as new and desired to secure by Letters Patent is as follows:

1. An installation procedures for a television set top converter for use in a television distribution system comprising the steps of:
   pre-programming said converter with a first set of proprietary data by transmitting by a hand held infrared transmitter a data stream formatted in a plurality of fields comprising binary data;
   receiving by said set top converter said data stream and detecting said binary data;
   loading the detected binary data into nonvolatile memory in said set top converter;
   setting said set top converter to a first state permitting limited access to channels in said distribution system;
   initiating a timeout counter in said set top converter when the set top converter is set to said first state;
   completing the programming of the converter by addressing the converter from a head end of the distribution system and transmitting a second set of proprietary data to the addressed converter; and
   if said timeout counter times out before said completing step, inhibiting all access to channels in said distribution system by said set top converter.

2. The process recited in claim 1 further comprising the step of transmitting from the head end a channel map table and channel authorization information which is received by said converter during said step of completing the programming of said converter.

3. The process recited in claim 1 wherein the step of completing the programming of the converter comprises the steps of:
   checking to determine if the converter is in said first state;
   checking to determine if said timeout counter has timed out; and
   if the converter is in said first state or if the timeout counter had timed out after said converter was in said first state, loading a working address into said nonvolatile memory and switching said set top converter to a second state allowing access to channels in said distribution system according to said second set of proprietary data.

4. The process recited in claim 3 further comprising the step of transmitting from the head end a channel map table and channel authorization information which is received by said converter and loaded in said nonvolatile memory.

5. The process recited in claim 4 further comprising the steps of:
   transmitting a feature command from said head end;
   receiving and detecting at said converter said feature command;
   checking at said converter to determine if said converter is set to said second state; and
   if so, enabling or disabling the feature of the command according to the command by storing data pertaining to said command in said nonvolatile memory.

6. An installation procedures for a television ste top converter for use in a television distribution system comprising the steps of:
   pre-programming said converter with a first set of proprietary data by transmitting by a hand held infrared transmitter a data stream formatted in a plurality of fields comprising binary data;
   receiving by said set top converter said data stream and detecting said binary data;
   loading the detected binary data into nonvolatile memory in said set top converter;
   setting said set top converter to a first state permitting limited access to channels in said distribution system;
   addressing the converter from a head end of the distribution system ad transmitting a second set of proprietary data to the addressed converter;
   checking to determine if the addressed converter is in said first state; and
   if so, loading a working address into said nonvolatile memory and swiching said set top converter to a second state allowing access to channels in said distribution system according to said second set of proprietary data.

7. The process recited in claim 6 further comprising prior to said pre-programming step the step of resetting said converter to receive said first set of proprietary data.

8. The process recited in claim 6 further comprising the step of transmitting from the head end a channel map table and channel authorization information which is received by said converter and loaded in said nonvolatile memory.

9. The process recited in calim 8 further comprising the steps of:
- transmitting a feature command from said head end;
- receiving and detecting at said converter said feature command;
- checking at said converter to determine if said converter is set to said second state; and
- if so, enabling or disabling the feature of the command according to the command by storing data pertaining to said command in said nonvolatile memory.

10. Apparatus for pre-programming a television set top converter for use in a television distribution system comprising:
- hand held infrared transmitter means for transmitting a data stream formatted in a plurality of fields comprising binary data, said binary data being a first set of proprietary data;
- infrared receiver means in said set top converter for receiving said data stream and detecting said binary data;
- a nonvolatile memory in said set top converter for storing proprietary data;
- means for loading the detected binary data into said nonvolatile memory and setting said set top converter to a first state permitting limited access to channels in said distribution system;
- radio frequency receiver means responsive to transmissions from a head end of said distribution system addressing the converter for receiving a second set of proprietary data; and
- means responsive to said radio frequency receiver means for checking to determine if the converter is in said first state and, if so, loading a working address into said nonvolatile memory and switching said set top converter to a second state allowing access to channels in said distribution system according to said second set of proprietary data.

11. The apparatus recited in claim 10, said hand held infrared transmitter means comprising:
- a second non-volatile memory containing preprogramming data;
- addressing means for reading out data from said second non-volatile memory; and
- an infrared transmitter connected to said second non-volatile memory for transmitting said data to said infrared receiver means.

12. Apparatus as recited in claim 11 wherein said pre-programming data contains information specific to a particular manufacturer's hardware, a separate hand held infrared transmitter means being provided for each such manufacturer's hardware used in said television distribution system.

13. The apparatus recited in claim 10, said set top converter comprising:
- a micro-controller connected to said infrared receiver means and to said radio frequency receiver means, said micro-controller detecting transmissions from said hand held infrared transmitter means and storing said first set of proprietary data in said nonvolatile memory and setting said set top converter in said first state, said micro-controller further detecting transmission from said head end when sid set top converter is in said first state and storing said second set of proprietary data in said nonvolatile memory and setting said set top converter to said second state.

* * * * *

UNITED STATES PATENT AND TRADEMARK OFFICE
CERTIFICATE OF CORRECTION

PATENT NO. : 5,093,921
DATED : March 3, 1992
INVENTOR(S) : George Lewis Bevins, Jr.

It is certified that error appears in the above—identified patent and that said Letters Patent is hereby corrected as shown below:

Column 9, Line 46: Change "procedures" to "procedure"

Column 10, Line 36: Change "procedures" to "procedure" and "ste" to "set"

Column 10, Line 51: Change "ad" to "and"

Column 12, Line 29: Change "sid" to "said"

Signed and Sealed this

First Day of June, 1993

Attest:

MICHAEL K. KIRK

Attesting Officer    Acting Commissioner of Patents and Trademarks